United States Patent
Kodemura et al.

(10) Patent No.: US 12,110,358 B2
(45) Date of Patent: Oct. 8, 2024

(54) SYNTHETIC POLYISOPRENE LATEX

(71) Applicant: ZEON CORPORATION, Tokyo (JP)

(72) Inventors: Junji Kodemura, Tokyo (JP); Shunjin Aihara, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1551 days.

(21) Appl. No.: 16/346,864

(22) PCT Filed: Nov. 2, 2017

(86) PCT No.: PCT/JP2017/039740
§ 371 (c)(1),
(2) Date: May 1, 2019

(87) PCT Pub. No.: WO2018/092604
PCT Pub. Date: May 24, 2018

(65) Prior Publication Data
US 2020/0062873 A1 Feb. 27, 2020

(30) Foreign Application Priority Data
Nov. 15, 2016 (JP) .................... 2016-222316

(51) Int. Cl.
| | |
|---|---|
| C08F 36/08 | (2006.01) |
| B29C 41/00 | (2006.01) |
| B29K 105/00 | (2006.01) |
| B32B 7/12 | (2006.01) |
| C08C 2/06 | (2006.01) |
| C08C 19/00 | (2006.01) |
| C08F 4/46 | (2006.01) |
| C08F 136/08 | (2006.01) |
| C08J 5/02 | (2006.01) |
| C08J 5/18 | (2006.01) |
| C08L 9/10 | (2006.01) |
| C08L 47/00 | (2006.01) |
| C09J 5/00 | (2006.01) |
| C09J 109/10 | (2006.01) |

(52) U.S. Cl.
CPC ............ *C08F 36/08* (2013.01); *B29C 41/003* (2013.01); *B32B 7/12* (2013.01); *C08C 2/06* (2013.01); *C08C 19/00* (2013.01); *C08F 4/461* (2013.01); *C08F 136/08* (2013.01); *C08J 5/02* (2013.01); *C08J 5/18* (2013.01); *C08L 9/10* (2013.01); *C08L 47/00* (2013.01); *C09J 5/00* (2013.01); *C09J 109/10* (2013.01); *B29K 2105/0064* (2013.01); *B32B 2553/00* (2013.01); *C08J 2309/10* (2013.01); *C09J 2409/00* (2013.01)

(58) Field of Classification Search
CPC .......... C08L 9/08; C08L 9/10; C08L 2205/02; C08F 36/08; C08F 36/04; C08F 4/48

USPC ............................................. 525/236; 526/11
See application file for complete search history.

(56) References Cited

U.S. PATENT DOCUMENTS

| | | | |
|---|---|---|---|
| 6,191,226 B1 | 2/2001 | Matsuda et al. | |
| 2009/0234064 A1* | 9/2009 | Wang .................. | C08K 5/0008 524/565 |
| 2013/0317176 A1 | 11/2013 | Liang et al. | |
| 2015/0087761 A1 | 3/2015 | Satoh et al. | |

FOREIGN PATENT DOCUMENTS

| | | |
|---|---|---|
| CN | 103450378 A | 12/2013 |
| EP | 1454621 A2 | 9/2004 |
| GB | 1016944 A | 1/1966 |
| JP | 5999103 B2 | 9/2016 |

OTHER PUBLICATIONS

Krutzer et al., Comparing polyisoprene latex to NR latex, Rubber & Plastic News, Mar. 23, 2015 (Year: 2015).*
Nov. 1, 2022 Office Action issued in Brazilian Patent Application No. BR112019009441-5.
Jan. 23, 2018 International Search Report issued in International Patent Application No. PCT/JP2017/039740.
Keiji Komuro; Isoprene rubber processing technology; Chemical Industry Press; 1980; pp. 14-15.
Dec. 31, 2021 Office Action issued in Chinese Patent Application No. 201780068191.7.
Apr. 6, 2020 Extended Search Report issued in European Patent Application No. 17871943.1.
Jun. 21, 2022 Third Party Observation issued in European Patent Application No. 17871943.1.
Jun. 28, 2022 Official Action issued in European Patent Application No. 17871943.1.
Tanaka, Yasuyuki, "Structural Characterization of Natural Polyisoprenes: Solve the Mystery of Natural Rubber Based on Structural Study", Department of Chemistry, Faculty of Science, Mahidol University, Thailand, 2001; pp. 355-375.

(Continued)

*Primary Examiner* — David J Buttner
*Assistant Examiner* — Surbhi M Du
(74) *Attorney, Agent, or Firm* — Oliff PLC

(57) ABSTRACT

A synthetic polyisoprene latex containing synthetic polyisoprene, wherein the synthetic polyisoprene constituting the synthetic polyisoprene latex includes a low-molecular weight synthetic isoprene chain having a molecular weight of less than 1,000,000 at a content rate of 10 to 70% by weight and a high-molecular weight synthetic isoprene chain having a molecular weight of 1,000,000 or more at a content rate of 30 to 90% by weight. Also, a method for producing the synthetic polyisoprene latex, wherein the synthetic polyisoprene containing the low-molecular weight synthetic isoprene chain and the high-molecular weight synthetic isoprene chain is obtained by polymerizing a monomer containing isoprene in an organic solvent by use of an organic alkali metal catalyst.

17 Claims, No Drawings

(56) References Cited

OTHER PUBLICATIONS

Kraton Data Document K0470 DDd-11 E, Jul. 2011, on Carliflex iRO401 BU latex.
Migchels, Peter, "Kraton ™ IR, a pure alternative", Rubber Technology International 1999. Retrieved by EPO on Jun. 10, 2004 partial report EP1454621.
Krutzer, Bert et al. "A Comparison Of Polyisoprene Latex To Natural Rubber Latex: Examples In The Use Of Straightdipped Goods", Latex and Synthetic Polymer Dispersions 2013.
Invoice (Aug. 24, 2015) and delivery (Aug. 17, 2015), Batch No. 04TPX1001, with Certificate of Analysis, Batch No. 04TPX1001 to Ansell Lanka, Sri Lanka, Aug. 20, 2015.
GPC, Batch No. 04TPX1001 (Apr. 17, 2015) reviewed on May 13, 2022.
Invoice (Jun. 7, 2015) and delivery (Jun. 2, 2015), Batch No. 04TPX1002 & 04TPX1005 to Molnlycke, including Certificate of Analysis.
GPC, Batch No. 04TPX1002 (Apr. 9, 2015) reviewed on May 13, 2022.
Certificate of Analysis, Batch No. 04TPX1003 to Semperit, Austria, Jun. 9, 2015, with Packing list of May 27, 2015 and Bill of Lading of Jun. 1, 2015.
GPC, Batch No. 04TPX1003 (Apr. 17, 2015) reviewed on May 13, 2022.
Certificate of Analysis, Batch No. 04TPX1004 and 04TPX1006 to Sempreit, Austria, Aug. 5, 2015, with a Bill of Lading of Aug. 2, 2015.
GPC, Batch No. 04TPX1004 (Apr. 17, 2015) reviewed on May 13, 2022.
Invoice (Aug. 16, 2015) and delivery (Aug. 7, 2015), Batch No. 04TPX1005 and 04TPX1008, with Certificate of Analysis, to Ansell NP, Malaysia, Aug. 19, 2015, a Packing list of Aug. 17, 2015 and a waybill of Aug. 16, 2015.
GPC, Batch No. 04TPX1005 (Apr. 17, 2015) reviewed on May 13, 2022.
Disclosed Anonymously, "Research Disclosure", RD566072, Published in Jun. 2011.
Aug. 24, 2021 Office Action issued in Brazilian Patent Application No. BR112019009441.
Nov. 11, 2023 Third-party Nullity Petition issued in Brazilian Patent Application No. 11 2019 009441-5.
"Rubber Composition", Research Disclosure, Research Disclosure Database No. 566072, p. 52-99, Jun. 2011.
Krutzer, B. et al., "A comparison of polyisoprene latex to natural rubber latex: Examples in the use of straight-dipped goods", Conference on Latex and Synthetic Polymer Dispersions, Kuala Lumpur, p. 10-11, 2013.
Migchels, P., "Kraton IR, a pure alternative", Rubber Technology International '99, p. 48-51, 1999.
May 14, 2024 Third-party Nullity Petition issued in Brazilian Patent Application No. BR112019009441-5.

\* cited by examiner

SYNTHETIC POLYISOPRENE LATEX

TECHNICAL FIELD

The present invention relates to a synthetic polyisoprene latex that is excellent in film formability and that can provide a film formed article, such as a dip formed article, not only excellent in tensile strength and elongation but also having a flexible texture, as well as a latex composition, a film formed article and a packaging structure using such a synthetic polyisoprene latex.

BACKGROUND ART

There has been conventionally known a film formed article obtained by molding of a latex composition containing a latex of natural rubber, into a film. For example, a film formed article known is a dip formed article that is obtained by dip forming of a latex composition containing a latex of natural rubber and that is for use in contact with the human body, such as a nipple, an air ball, a glove, a balloon, or a sack. A latex of natural rubber, however, contains a protein causing an allergy symptom in the human body, and thus is problematic in terms of use in a dip formed article that is in direct contact with the mucous membrane or organs of a living body. Therefore, studies about use of not a latex of natural rubber, but a latex of synthetic rubber have been increasingly made.

For example, Patent Document 1 discloses a synthetic polyisoprene latex having a weight average molecular weight controlled within a predetermined range, as a latex for use in dip forming. The technique of Patent Document 1, however, has the problem of being inferior in film formability in dip forming, depending on the synthetic polyisoprene used, resulting in a reduction in tensile strength of the resulting dip formed article.

RELATED ART

Patent Document

Patent Document 1: Japanese Patent No. 5999103

SUMMARY OF THE INVENTION

Problem to be Solved by the Invention

The present invention has been made in view of such circumstances, and an object thereof is to provide a synthetic polyisoprene latex that is excellent in film formability and that can provide a film formed article, such as a dip formed article, excellent in tensile strength and elongation and also having a flexible texture.

Means for Solving the Problem

The present inventors have made intensive studies in order to achieve the above object, and as a result, have found that the above object can be achieved by a synthetic polyisoprene latex containing a synthetic isoprene chain relatively low in molecular weight and a synthetic isoprene chain relatively high in molecular weight at each predetermined rate, thereby leading to completion of the present invention.

That is, according to the present invention, provided is a synthetic polyisoprene latex containing synthetic polyisoprene, wherein the synthetic polyisoprene constituting the synthetic polyisoprene latex includes a low-molecular weight synthetic isoprene chain having a molecular weight of less than 1,000,000 at a content rate of 10 to 70% by weight and a high-molecular weight synthetic isoprene chain having a molecular weight of 1,000,000 or more at a content rate of 30 to 90% by weight.

In the synthetic polyisoprene latex of the present invention, the synthetic polyisoprene preferably has a molecular weight distribution curve that is bimodal with two local maximum points of a local maximum point with respect to the low-molecular weight synthetic isoprene chain and a local maximum point with respect to the high-molecular weight synthetic isoprene chain being present.

Moreover, according to the present invention, provided is a method for producing the synthetic polyisoprene latex, wherein the synthetic polyisoprene containing the low-molecular weight synthetic isoprene chain and the high-molecular weight synthetic isoprene chain is obtained by polymerizing a monomer containing isoprene in an organic solvent by use of an organic alkali metal catalyst.

In the method for producing the synthetic polyisoprene latex of the present invention, an organic solvent including a deactivator is preferably used as the organic solvent.

Furthermore, according to the present invention, provided is a method for producing the synthetic polyisoprene latex, including a step of polymerizing a monomer containing isoprene in an organic solvent by use of an organic alkali metal catalyst, thereby obtaining a first polymer solution mainly containing the low-molecular weight synthetic isoprene chain, a step of polymerizing a monomer containing isoprene in an organic solvent by use of an organic alkali metal catalyst, thereby obtaining a second polymer solution mainly containing the high-molecular weight synthetic isoprene chain, and a step of mixing the first polymer solution and the second polymer solution, thereby obtaining the synthetic polyisoprene.

In the method for producing a synthetic polyisoprene latex of the present invention, an amount of the organic alkali metal catalyst to be used in obtaining the first polymer solution is preferably larger than an amount of the organic alkali metal catalyst to be used in obtaining the second polymer solution.

Furthermore, according to the present invention, provided is a method for producing the synthetic polyisoprene latex, including a step of emulsifying a polymer solution of the synthetic polyisoprene obtained by polymerizing a monomer containing isoprene, by use of an aqueous surfactant solution.

According to the present invention, provided is a latex composition including the synthetic polyisoprene latex and a cross-linking agent.

Moreover, according to the present invention, provided is a film formed article including the latex composition.

Furthermore, according to the present invention, provided is a packaging structure obtained by performing adhesion and stacking of at least a part of a first sheet substrate and at least a part of a second sheet substrate thorough a coating film including the synthetic polyisoprene latex, wherein an object to be packaged is receivable between the first sheet substrate and the second sheet substrate.

Effects of Invention

According to the present invention, there can be provided a synthetic polyisoprene latex that is excellent in film formability and that can provide a film formed article, such as a dip formed article, not only excellent in tensile strength and elongation but also having a flexible texture, as well as a latex composition, a film formed article and a packaging structure by use of such a synthetic polyisoprene latex.

DESCRIPTION OF EMBODIMENTS

The synthetic polyisoprene latex of the present invention contains synthetic polyisoprene, in which the synthetic polyisoprene constituting the synthetic polyisoprene latex includes a low-molecular weight synthetic isoprene chain having a molecular weight of less than 1,000,000 at a content rate of 10 to 70% by weight and a high-molecular weight synthetic isoprene chain having a molecular weight of 1,000,000 or more at a content rate of 30 to 90% by weight.

Synthetic Polyisoprene

The synthetic polyisoprene contained in the synthetic polyisoprene latex of the present invention is obtained by solution polymerization of isoprene and, if necessary, other ethylenically unsaturated monomer copolymerizable therewith, in an inert organic solvent, and the synthetic polyisoprene contains not only a low-molecular weight synthetic isoprene chain having a molecular weight of less than 1,000,000 at a rate of 10 to 70% by weight, but also a high-molecular weight synthetic isoprene chain having a molecular weight of 1,000,000 or more at a rate of 30 to 90% by weight.

According to the present invention, the synthetic polyisoprene constituting the synthetic polyisoprene latex can contain the low-molecular weight synthetic isoprene chain and the high-molecular weight synthetic isoprene chain at the above rates, resulting in an enhancement in film formability in production of a film formed article such as dip formed article by use of the synthetic polyisoprene latex, thereby allowing the resulting film formed article to not only be excellent in tensile strength and elongation, but also have a flexible texture.

That is, a synthetic isoprene chain relatively high in molecular weight has physical properties such as excellent tensile strength, but a latex including only such a synthetic isoprene chain high in molecular weight causes film formability to be inferior in production of a film formed article such as a dip formed article by use of the latex (specifically, insufficient adhesion between the synthetic isoprene chains in film formation), resulting in a reduction in tensile strength of the resulting film formed article.

On the contrary, according to the present invention, use of a synthetic polyisoprene latex containing not only a synthetic isoprene chain relatively high in molecular weight, but also a synthetic isoprene chain relatively low in molecular weight can allow the synthetic isoprene chain relatively low in molecular weight to act so that adhesion between the synthetic isoprene chains relatively high in molecular weight is promoted in production of a film formed article, such as a dip formed article, by use of a synthetic polyisoprene latex, thereby enhancing film formability, resulting in an enhancement in tensile strength of the resulting film formed article. That is, according to the present invention, use of a synthetic polyisoprene latex containing a low-molecular weight synthetic isoprene chain and a high-molecular weight synthetic isoprene chain, as described above, can not only prevent a reduction in tensile strength due to insufficient film formation, with the action of the low-molecular weight synthetic isoprene chain, but also impart ensuring of high tensile strength with the action of the high-molecular weight synthetic isoprene chain, in production of a film formed article such as a dip formed article.

The low-molecular weight synthetic isoprene chain and the high-molecular weight synthetic isoprene chain may be each independently a homopolymer of isoprene or may be copolymerized with other ethylenically unsaturated monomer copolymerizable with isoprene, and the content of the isoprene unit is preferably 70% by weight or more, more preferably 90% by weight or more, further preferably 95% by weight or more, particularly preferably 100% by weight (homopolymer of isoprene) based on the total monomer unit, from the viewpoint that a film formed article such as a flexible dip formed article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/ or methyl methacrylate", hereinafter, much the same is true on ethyl (meth)acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

In the present invention, the content rate of the low-molecular weight synthetic isoprene chain and the content rate of the high-molecular weight synthetic isoprene chain in the synthetic polyisoprene can be determined by measuring the molecular weight distribution curve in terms of standard polystyrene by gel permeation chromatography analysis, and defining the rate (unit: % by weight) of a synthetic isoprene chain having a molecular weight in the range of less than 1,000,000 as the content rate of the low-molecular weight synthetic isoprene chain, and the rate (unit: % by weight) of a synthetic isoprene chain having a molecular weight in the range of 1,000,000 or more as the content rate of the high-molecular weight synthetic isoprene chain, based on the resulting molecular weight distribution curve.

The content rate of the low-molecular weight synthetic isoprene chain may be 10 to 70% by weight, as described above, and is preferably 20 to 65% by weight, more preferably 30 to 60% by weight, most preferably 40 to 55% by weight. The content rate of the low-molecular weight synthetic isoprene chain is in the above range, thereby allowing film formability in dip forming by use of the resulting synthetic polyisoprene latex to be more enhanced, resulting in a more enhancement in tensile strength of the resulting film formed article such as a dip formed article.

The content rate of the high-molecular weight synthetic isoprene chain may be 30 to 90% by weight as described above, and is preferably 35 to 80% by weight, more preferably 40 to 70% by weight, most preferably 45 to 60% by weight. The content rate of the high-molecular weight synthetic isoprene chain is in the above range, resulting in a tendency to not only more enhance tensile strength of the resulting film formed article such as a dip formed article, but also allow for easy production of the high-molecular weight synthetic isoprene chain.

The synthetic polyisoprene contained in the synthetic polyisoprene latex of the present invention may be any one containing the low-molecular weight synthetic isoprene chain and the high-molecular weight synthetic isoprene chain at the above-mentioned content rates, the molecular weight distribution curve may have two or more local maximum points, and it is preferable that two local maximum points of a local maximum point with respect to the low-molecular weight synthetic isoprene chain and a local maximum point with respect to the high-molecular weight synthetic isoprene chain be present (bimodality). In such a case, the weight average molecular weight with respect to the low-molecular weight synthetic isoprene chain (for example, in the case where a local minimum point located between the local maximum point with respect to the low-molecular weight synthetic isoprene chain and the local maximum point with respect to the high-molecular weight synthetic isoprene chain is defined as the boundary, the above weight average molecular weight corresponds to a weight average molecular weight on a side of a lower molecular weight relative to the local minimum point) is preferably 100,000 to 1,000,000, more preferably 200,000 to 700,000, further preferably 300,000 to 500,000. The weight average molecular weight with respect to the low-molecular weight synthetic isoprene chain is in the above range, thereby allowing film formability in dip forming by use of the resulting synthetic polyisoprene latex to be more enhanced, resulting in a more enhancement in tensile strength of the resulting film formed article such as a dip formed article. Similarly, the weight average molecular weight with respect to the high-molecular weight synthetic isoprene chain (for example, in the case where a local minimum point located between the local maximum point with respect to the low-molecular weight synthetic isoprene chain and the local maximum point with respect to the high-molecular weight synthetic isoprene chain is defined as the boundary, the above weight average molecular weight corresponds to a weight average molecular weight on a side of a higher molecular weight at the local minimum point or more) is preferably 2,000,000 to 6,000,000, more preferably 2,500,000 to 5,500,000, further preferably 3,000,000 to 5,000,000. The weight average molecular weight with respect to the high-molecular weight synthetic isoprene chain is in the above range, resulting in a tendency to not only more enhance tensile strength of the resulting film formed article such as a dip formed article, but also allow for easy production of the high-molecular weight synthetic isoprene chain.

Examples of the method for obtaining the synthetic polyisoprene contained in the synthetic polyisoprene latex of the present invention include a method where, for example, a deactivator is used in obtaining the synthetic polyisoprene by polymerization of isoprene and, if necessary, other ethylenically unsaturated monomer copolymerizable therewith, resulting in a decrease in the molecular weight of a part of a synthetic isoprene chain obtained by polymerization, thereby allowing the low-molecular weight synthetic isoprene chain and the high-molecular weight synthetic isoprene chain to be contained at the rates, and a method where a synthetic isoprene chain is coupled by use of a coupling agent, resulting in an increase in the molecular weight of a part of the synthetic isoprene chain, thereby allowing the low-molecular weight synthetic isoprene chain and the high-molecular weight synthetic isoprene chain to be contained at the rates. Alternatively, a method may be used where a first polymer solution mainly containing a synthetic isoprene chain having a molecular weight of less than 1,000,000, synthesized in advance, and a second polymer solution mainly containing a synthetic isoprene chain having a molecular weight of 1,000,000 or more, synthesized in advance are mixed. Among them, a method where a deactivator is used and a method where a coupling agent is used are preferable from the viewpoint that the production efficiency of the synthetic polyisoprene is excellent, and furthermore a method where a deactivator is used is particularly preferable from the viewpoint that the molecular weight of a synthetic isoprene chain can be more favorably controlled.

The deactivator for use in the method of using the deactivator is not particularly limited, and examples can include compounds having active hydrogen, for example, water; alcohols such as methanol, ethanol, propyl alcohol, butanol, ethylene glycol, propylene glycol, and glycerin; and phenols such as phenol, cresol, α,β-naphthanol, nonylphenol, and t-butyl-hydroxytoluene. Among them, water and alcohols are preferable, and water is particularly preferable. Such deactivators can be used singly or in combinations of two or more kinds thereof.

The method for adding the deactivator is not particularly limited, examples include a method where, in the case of solution polymerization of isoprene and, if necessary, other ethylenically unsaturated monomer copolymerizable therewith in an inert organic solvent, an organic solvent including the deactivator is used as such an inert organic solvent, and a method including adding the deactivator in solution polymerization, and a method where an organic solvent including the deactivator is used as the organic solvent is preferable from the viewpoint that the molecular weight of a synthetic isoprene chain can be more favorably controlled.

In the case of use of an organic solvent including the deactivator, the content rate of the deactivator in the organic solvent is preferably 3 to 100 ppm by weight, more preferably 5 to 50 ppm by weight, further preferably 10 to 30 ppm by weight.

The method for adjusting the content rate of the deactivator in the organic solvent in the range is not particularly limited, and examples include a method including bringing the organic solvent into contact with a drying agent such as a molecular sieve, to adjust the amount of water in the organic solvent, in the case of use of water as the deactivator.

In the method where a coupling agent is used, examples of the coupling agent include, but are not particularly limited, tin tetrachloride; and silicon halide compounds such as hexachlorodisilane, bis(trichlorosilyl)methane, 1,2-bis(trichlorosilyl)ethane, 1,3-bis(trichlorosilyl) propane, 1,4-bis(trichlorosilyl) butane, 1,5-bis(trichlorosilyl)pentane and 1,6-bis(trichlorosilyl)hexane. Such coupling agents can be used singly or in combinations of two or more kinds thereof.

The method for reacting the synthetic isoprene chain with the coupling agent may be any method where a solution containing a synthetic isoprene chain having an active end can be mixed with the coupling agent, and is not particularly limited and is preferably, for example, a method where the coupling agent is added to a solution containing a synthetic isoprene chain having an active end, from the viewpoint that a coupling reaction can be favorably controlled. The coupling agent is here preferably added with being dissolved in an inert solvent.

The synthetic isoprene chain can be obtained by a conventionally known method, for example, by solution polymerization of isoprene and, if necessary, other ethylenically unsaturated monomer copolymerizable therewith in an inert organic solvent, by use of a polymerization catalyst such as an organic alkali metal catalyst or a Ziegler type polymerization catalyst. In the case where the deactivator, the coupling agent or the like is used to adjust the molecular weight of the synthetic isoprene chain in such solution polymerization, as described above, synthetic polyisoprene where the low-molecular weight synthetic isoprene chain and the high-molecular weight synthetic isoprene chain are present in combination can be still obtained.

In the case where a polymer solution of synthetic polyisoprene is obtained by solution polymerization, the polymer solution may be used, as it is, for production of a synthetic polyisoprene latex described below, or the polymer solution, from which the solid synthetic polyisoprene is taken out and then dissolved in an organic solvent, can also be used for production of a synthetic polyisoprene latex.

Here, impurities such as a residue of a polymerization catalyst, remaining in the polymer solution after synthesis, may be removed. An antioxidant described below may be added to a solution during polymerization or after polymerization.

Also in the case of use of a method where a first polymer solution mainly containing a synthetic isoprene chain having a molecular weight of less than 1,000,000 (low-molecular weight synthetic isoprene chain) synthesized in advance and a second polymer solution mainly containing a synthetic isoprene chain having a molecular weight of 1,000,000 or more (high-molecular weight synthetic isoprene chain) synthesized in advance are mixed is used as the method for providing the synthetic polyisoprene contained in the synthetic polyisoprene latex of the present invention, as described above, the low-molecular weight synthetic isoprene chain and the high-molecular weight synthetic isoprene chain can be each synthesized by solution polymerization in the same manner.

Examples of the method for selectively obtaining the low-molecular weight synthetic isoprene chain or selectively obtaining the high-molecular weight synthetic isoprene chain by solution polymerization include a method where the type and the amount of the polymerization catalyst for use in solution polymerization are adjusted.

For example, in the case of use of an organic alkali metal catalyst as the polymerization catalyst, a larger amount of the organic alkali metal catalyst to be used can result in an increase in the starting point of polymerization due to the action of the organic alkali metal catalyst, thereby allowing the molecular weight of the resulting synthetic isoprene chain to be controlled to a relatively low value, thereby enabling the low-molecular weight synthetic isoprene chain to be selectively obtained. On the other hand, a smaller amount of the organic alkali metal catalyst to be used can result in a decrease in the starting point of polymerization, thereby the molecular weight of the resulting synthetic isoprene chain to be controlled to a relatively high value, thereby enabling the high-molecular weight synthetic isoprene chain to be selectively obtained.

In the case of use of a Ziegler type catalyst as the polymerization catalyst, the action of the Ziegler type catalyst tends to allow the resulting synthetic isoprene chain to have a relatively low molecular weight, thereby enabling the low-molecular weight synthetic isoprene chain to be selectively obtained.

The organic alkali metal catalyst is not particularly limited, and examples include organomonolithium compounds such as n-butyllithium, sec-butyllithium, t-butyllithium, hexyllithium, phenyllithium and stilbene lithium; organic polyvalent lithium compounds such as dilithiomethane, 1,4-dilithiobutane, 1,4-dilithio-2-ethylcyclohexane, 1,3,5-trilithiobenzene and 1,3,5-tris (lithiomethyl) benzene; organosodium compounds such as sodium naphthalene; and organopotassium compounds such as potassium naphthalene. Among them, any organomonolithium compound is preferably used, and n-butyllithium is more preferably used. Such organic alkali metal catalysts can be each used singly or in combinations of two or more kinds thereof.

The method for adding the organic alkali metal catalyst may be, for example, a method including adding the organic alkali metal catalyst, as it is, to a reaction vessel charged with monomer(s) (isoprene, and an ethylenically unsaturated monomer copolymerizable with isoprene, if necessary used), or a method including adding the organic alkali metal catalyst being dissolved in an inert solvent such as hexane.

The amount of the organic alkali metal catalyst to be used is usually in the range of 1 to 50 mmol per 1000 g of monomer(s) for use in polymerization (isoprene, and an ethylenically unsaturated monomer copolymerizable with isoprene, if necessary used), and is preferably in the range of 5 to 40 mmol, more preferably 10 to 30 mmol in the case where the low-molecular weight synthetic isoprene chain is to be selectively obtained. The amount is preferably in the range of 2 to 20 mmol, more preferably 5 to 10 mmol per 1000 g of such monomer(s) for use in polymerization in the case where the high-molecular weight synthetic isoprene chain is to be selectively obtained.

The Ziegler type catalyst is not particularly limited, a known catalyst can be used, and examples thereof include a catalytic system where a titanium trichloride composition obtained by reducing titanium tetrachloride with an organoaluminum compound and further treating the resultant with any of various electron donors and electron acceptors is combined with an organoaluminum compound, and a supported catalytic system obtained by bringing magnesium halide into contact with titanium tetrachloride and any of various electron donors. In particular, a catalytic system with titanium tetrachloride and an organoaluminum compound is preferable, and a catalytic system with titanium tetrachloride and trialkyl aluminum is particularly preferable.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene is preferably 70% by weight or more, more preferably 90% by weight or more, further preferably 95% by weight or more based on the total isoprene unit, from the viewpoint of an enhancement in tensile strength of the resulting film formed article such as a dip formed article.

The polymer Mooney viscosity ($ML_{1+4}$, 100° C.) of the synthetic polyisoprene is preferably 50 to 80, more preferably 60 to 80, further preferably 70 to 80.

The synthetic polyisoprene latex of the present invention is a latex including the above-mentioned synthetic polyisoprene.

Examples of the method for obtaining the synthetic polyisoprene latex include (1) a method for producing the synthetic polyisoprene latex, where a polymer solution of synthetic polyisoprene obtained by solution polymerization of single isoprene dissolved in an organic solvent, or a mixture of isoprene dissolved in an organic solvent, with an ethylenically unsaturated monomer copolymerizable therewith, is directly emulsified by use of an aqueous surfactant solution, (2) a method for producing the synthetic polyisoprene latex, where a solution or a fine suspension obtained by dissolution or fine dispersion of synthetic polyisoprene once coagulated, in an organic solvent, is emulsified in water in the presence of a surfactant and, if necessary, the organic solvent is removed, and (3) a method for producing the synthetic polyisoprene latex, where a mixed liquid obtained by mixing a solution or a fine suspension obtained by dissolution or fine dispersion of the low-molecular weight synthetic isoprene chain once coagulated, in an organic solvent, with a solution or a fine suspension obtained by dissolution or fine dispersion of the high-molecular weight synthetic isoprene chain once coagulated, in an organic solvent, is emulsified in water in the presence of a surfactant and, if necessary, the organic solvent is removed. Among them, the production method (1) is preferable from the viewpoint that synthetic polyisoprene high in the rate of the cis bond unit in the isoprene unit can be used and a film formed article, such as a dip formed article, excellent in mechanical properties such as tensile strength is easily obtained.

Examples of the organic solvent for use in the production method (1) can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as pentane, hexane and heptane; and halogenated hydrocarbon solvents such as methylene chloride, chloroform and ethylene dichloride. Among them, aliphatic hydrocarbon solvents are preferable, hexane is more preferable, and n-hexane is particularly preferable.

The amount of the organic solvent to be used is here preferably 2,000 parts by weight or less, more preferably 20 to 1,500 parts by weight, further preferably 500 to 1500 based on 100 parts by weight of the total of isoprene, and an ethylenically unsaturated monomer copolymerizable with isoprene, if necessary used.

Examples of the surfactant for use in the production method (1) include anionic surfactants, for example, fatty acid salts such as sodium laurate, potassium myristate, sodium palmitate, potassium oleate, sodium linoleate and sodium rosinate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate and potassium cetylbenzenesulfonate; alkylsulfosuccinic acid salts such as sodium di(2-ethylhexyl) sulfosuccinate, potassium di(2-ethylhexyl) sulfosuccinate and dioctyl sodium sulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; and monoalkylphosphoric acid salts such as sodium lauryl phosphate and potassium lauryl phosphate.

Among these anionic surfactants, fatty acid salts, alkylbenzenesulfonic acid salts, alkylsulfosuccinic acid salts, alkylsulfuric acid ester salts and polyoxyethylene alkyl ether sulfuric acid ester salts are preferable, fatty acid salts and alkylbenzenesulfonic acid salts are more preferable, fatty acid salts are further preferable, and rosinates such as sodium rosinate and potassium rosinate are particularly preferable.

It is preferable to use at least one selected from the group consisting of alkylbenzenesulfonic acid salts, alkylsulfosuccinic acid salts, alkylsulfuric acid ester salts and polyoxyethylene alkyl ether sulfuric acid ester salts in combination with any fatty acid salt, and it is particularly preferable to use any alkylbenzenesulfonic acid salt in combination with any fatty acid salt, because a polymerization catalyst remaining in a trace amount, caused by the synthetic polyisoprene, can be more efficiently removed and generation of an aggregate in production of a latex composition is suppressed. Preferable fatty acid salts are sodium rosinate and potassium rosinate, and preferable alkylbenzenesulfonic acid salts are sodium dodecylbenzenesulfonate and potassium dodecylbenzenesulfonate. Such surfactants may be used singly or in combinations of two or more kinds thereof.

As described above, at least one selected from the group consisting of alkylbenzenesulfonic acid salts, alkylsulfosuccinic acid salts, alkylsulfuric acid ester salts and polyoxyethylene alkyl ether sulfuric acid ester salts is used in combination with any fatty acid salt, thereby allowing the resulting latex to contain at least one selected from alkylbenzenesulfonic acid salts, alkylsulfosuccinic acid salts, alkylsulfuric acid ester salts and polyoxyethylene alkyl ether sulfuric acid ester salts, and any fatty acid salt.

Any surfactant other than the anionic surfactant may also be used in combination in the production method (1), and examples of such any surfactant other than the anionic surfactant include copolymerizable surfactants such as $\alpha,\beta$-unsaturated carboxylic acid sulfoester, $\alpha,\beta$-unsaturated carboxylic acid sulfate ester and sulfoalkyl aryl ether.

Furthermore, any nonionic surfactant such as polyoxyethylene alkyl ether, polyoxyethylene alkyl phenol ether, polyoxyethylene alkyl ester or polyoxyethylene sorbitan alkyl ester may also be used in combination as long as coagulation by the coagulating agent for use in dip forming is not impaired.

The amount of the anionic surfactant for use in the production method (1) is preferably 0.1 to 50 parts by weight, more preferably 0.5 to 30 parts by weight based on 100 parts by weight of the synthetic polyisoprene. In the case of use of two or more kinds of such surfactants, the total amount thereof to be used is preferably in the range. That is, for example, in the case of use of at least one selected from alkylbenzenesulfonic acid salts, alkylsulfosuccinic acid salts, alkylsulfuric acid ester salts and polyoxyethylene alkyl ether sulfuric acid ester salts in combination with any fatty acid salt, the total amount thereof to be used is preferably in the range. A too small amount of the anionic surfactant to be used may cause a large amount of an aggregate in emulsification to be generated, and on the contrary, a too large amount of the anionic surfactant to be used can cause foaming to easily occur, resulting in generation of pinholes in the resulting film formed article such as a dip formed article.

In the case of use of at least one selected from alkylbenzenesulfonic acid salts, alkylsulfosuccinic acid salts, alkylsulfuric acid ester salts and polyoxyethylene alkyl ether sulfuric acid ester salts in combination with any fatty acid salt, in the anionic surfactant, the ratio thereof to be used, "fatty acid salt":"total surfactant of at least one selected from alkylbenzenesulfonic acid salts, alkylsulfosuccinic acid salts, alkylsulfuric acid ester salts and polyoxyethylene alkyl ether sulfuric acid ester salts" on a weight ratio is preferably in the range of 1:1 to 10:1, more preferably in the range of 1:1 to 7:1. A too high ratio of at least one surfactant selected from alkylbenzenesulfonic acid salts, alkylsulfosuccinic acid salts, alkylsulfuric acid ester salts and polyoxyethylene alkyl ether sulfuric acid ester salts may result in vigorous foaming in handling of the synthetic polyisoprene, resulting in a need for an operation such as standing for a long time or addition of any defoamer, thereby leading to deterioration in workability and an increase in the cost.

The amount of water in the aqueous surfactant solution for use in the production method (1) is preferably 30 to 150 parts by weight, more preferably 40 to 100 parts by weight, most preferably 50 to 70 based on 100 parts by weight of the polymer solution of the synthetic polyisoprene. Examples of the type of water to be used include hard water, soft water, ion-exchange water, distilled water and zeolite water, and soft water, ion-exchange water and distilled water are preferable.

Any apparatus which is a generally commercially available emulsifying machine or dispersing machine can be used, without any particular limitations, as the apparatus for direct emulsification of the polymer solution of the synthetic polyisoprene by use of the aqueous surfactant solution. The method for adding the surfactant to the solution or fine suspension of the synthetic polyisoprene is not particularly limited, and the surfactant may be added to any one of or both water and the polymer solution of the synthetic polyisoprene in advance, may be added to an emulsified liquid during an emulsifying operation, or may be added collectively or in portions.

Examples of the emulsifying apparatus include batch type emulsifying machines such as trade name "Homogenizer" (manufactured by IKA), trade name "Polytron" (manufactured by Kinematica) and trade name "TK Auto Homomixer" (manufactured by Primix Corporation); continuous emulsifying machines such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) and trade name "Fine flow mill" (manufactured by Pacific Machinery & Engineering Co., Ltd.); high-pressure emulsifying machines such as trade name "Microfluidizer" (manufactured by Mizuho Industrial Co., Ltd.), trade name "Nanomizer" (manufactured by Nanomizer Inc.) and trade name "APV Gaulin" (manufactured by APV Gaulin Inc.); membrane emulsifying machines such as trade name "Membrane emulsifying machine" (manufactured by Reica Co., Ltd.); vibration type emulsifying machines such as trade name "Vibromixer" (manufactured by Reica Co., Ltd.); and ultrasonic emulsifying machines such as trade name "Ultrasonic homogenizer" (manufactured by Branson Ultrasonics, Emerson Japan, Ltd.). Herein, the emulsifying operation conditions by the emulsifying apparatus are not particularly limited, and the treatment temperature and the treatment time may be appropriately selected so that a desired dispersing state is achieved.

In the production method (1), the organic solvent is desirably removed from an emulsified product obtained through the emulsifying operation.

The method for removing the organic solvent from the emulsified product is preferably a method which enables the content of the organic solvent (preferably alicyclic hydrocarbon solvent) in the resulting synthetic polyisoprene latex to be 500 ppm by weight or less, and, for example, a method of distillation under reduced pressure, atmospheric distillation, steam distillation or centrifugation can be adopted.

In the method (1), the synthetic polyisoprene latex is desirably obtained by removing the organic solvent from an emulsified product obtained through the emulsifying operation.

The method for removing the organic solvent from the emulsified product is preferably a method which enables the content of the organic solvent (preferably alicyclic hydrocarbon solvent) in the resulting synthetic polyisoprene latex to be 500 ppm by weight or less, and, for example, a method of distillation under reduced pressure, atmospheric distillation, steam distillation or centrifugation can be adopted.

After removal of the organic solvent, if necessary, any concentrating operation may be conducted by a method of distillation under reduced pressure, atmospheric distillation, centrifugation, membrane concentration or the like in order to increase the solid content concentration of the synthetic polyisoprene latex, and in particular, centrifugation is preferably performed from the viewpoint that not only the solid content concentration in the synthetic polyisoprene latex can be increased, but also the remaining amount of the surfactant in the synthetic polyisoprene latex can be reduced.

Centrifugation is preferably performed, for example, with a continuous centrifuge machine in conditions of a preferable centrifugal force of 100 to 10,000 G, a preferable solid content concentration of the synthetic polyisoprene latex before centrifugation, of 2 to 15% by weight, a preferable flow rate for feeding to the centrifuge machine, of 500 to 1700 Kg/hr, and a preferable back pressure (gauge pressure) of the centrifuge machine, of 0.03 to 1.6 MPa, and the latex of synthetic polyisoprene can be obtained as a light liquid after centrifugation. Thus, the remaining amount of the surfactant in the latex of synthetic polyisoprene can be reduced.

The solid content concentration in the synthetic polyisoprene latex of the present invention is preferably 30 to 70% by weight, more preferably 40 to 70% by weight. The solid content concentration can be in the range, thereby allowing the synthetic polyisoprene latex to be more favorably transferred in a pipe arrangement and/or stirred in a formulating tank, and also allowing strength of the resulting film formed article such as a dip formed article to be more enhanced.

The volume average particle size of the synthetic polyisoprene latex of the present invention is preferably 0.1 to 10 μm, more preferably 0.5 to 3.0 μm, further preferably 0.5 to 2.0 μm. The volume average particle size can be in the range, thereby imparting a proper latex viscosity to thereby facilitate handling, and inhibiting a film from being generated on the latex surface in storage of the synthetic polyisoprene latex.

To the synthetic polyisoprene latex may be compounded additive(s) commonly compounded in the latex field, such as a pH adjuster, a defoamer, a preservative, a cross-linking agent, a chelating agent, an oxygen scavenger, a dispersing agent and an antioxidant.

Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and any alkali metal hydroxide or ammonia is preferable.

The latex composition of the present invention is obtained by adding a cross-linking agent to the above-mentioned the synthetic polyisoprene latex of the present invention.

Examples of the cross-linking agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, N,N'-dithio-bis(hexahydro-2H-azepinone-2), phosphorus-containing polysulfide, polymeric polysulfide and 2-(4'-morpholinodithio)benzothiazole. Among them, sulfur can be preferably used. Such cross-linking agents can be used singly or in combinations of two or more kinds thereof.

The content of the cross-linking agent is not particularly limited, and is preferably 0.1 to 10 parts by weight, more preferably 0.2 to 3 parts by weight based on 100 parts by weight of the synthetic polyisoprene constituting the synthetic polyisoprene latex. The content of the crosslinking agent can be in the range, thereby allowing tensile strength of the resulting film formed article such as a dip formed article to be more enhanced.

The latex composition of the present invention preferably further contains a cross-linking accelerator.

A cross-linking accelerator usually used in dip forming can be used, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbarylthio)benzothiazole, 2-(2,6-dimethyl-4-morpholinothio)benzothiazole, 2-(4'-morpholino-dithio)benzothiazole, 4-morpholinyl-2-benzothiazyl-disulfide and 1,3-bis(2-benzothiazyl-mercaptomethyl)urea, and zinc diethyldithiocarbamate, zinc 2-dibutyldithiocarbamate and zinc 2-mercaptobenzothiazole are preferable. Such cross-linking accelerators can be used singly or in combinations of two or more kinds thereof.

The content of the cross-linking accelerator is preferably 0.05 to 5 parts by weight, more preferably 0.1 to 2 parts by weight based on 100 parts by weight of the synthetic polyisoprene constituting the synthetic polyisoprene latex. The content of the cross-linking accelerator can be in the range, thereby allowing tensile strength of the resulting film formed article such as a dip formed article to be more enhanced.

The latex composition of the present invention preferably further contains zinc oxide.

The content of the zinc oxide is not particularly limited, and is preferably 0.1 to 5 parts by weight, more preferably 0.2 to 2 parts by weight based on 100 parts by weight of the synthetic polyisoprene constituting the synthetic polyisoprene latex. The content of the zinc oxide can be in the range, thereby allowing tensile strength of the resulting film formed article such as a dip formed article to be more enhanced, with emulsification stability being favorable.

To the latex composition of the present invention can be, if necessary, further compounded a compounding agent, for example, an antioxidant, a dispersing agent; a reinforcement agent such as carbon black, silica or talc; a filler such as calcium carbonate or clay; an ultraviolet absorber; or a plasticizer.

Examples of the method for preparing the latex composition of the present invention include, but are not particularly limited, a method including mixing the cross-linking agent and various compounding agents, if necessary compounded, with the synthetic polyisoprene latex by use of a dispersing machine such as a ball mill, a kneader or a disper, and a method including preparing an aqueous dispersion liquid of a compounding component other than the synthetic polyisoprene latex, by use of the dispersing machine, and thereafter mixing the aqueous dispersion liquid with the synthetic polyisoprene latex.

The pH of the latex composition of the present invention is preferably 7 or more, more preferably in the range of 7 to 13, further preferably in the range of 8 to 12. The solid content concentration of the latex composition is preferably in the range of 15 to 65% by weight.

The latex composition of the present invention is preferably subjected to aging (pre-cross-linking) before forming such as dip forming from the viewpoint that mechanical properties of the resulting film formed article such as a dip formed article are more enhanced. The pre-cross-linking time is not particularly limited, and is preferably 1 to 14 days, more preferably 1 to 7 days, depending on the pre-cross-linking temperature. The pre-cross-linking temperature is preferably 20 to 40° C.

The resultant is preferably stored at a temperature of 10 to 30° C. for the period from completion of the pre-crosslinking to molding such as dip forming. Storage of the resultant at a high temperature may cause a reduction in tensile strength of the resulting film formed article such as a dip formed article.

Film Formed Article

The film formed article of the present invention is a film-shaped molded article including the latex composition of the present invention. The thickness of the film formed article of the present invention is preferably 0.03 to 0.50 mm, more preferably 0.05 to 0.40 mm, particularly preferably 0.08 to 0.30 mm.

The film formed article of the present invention is not particularly limited, and is suitably a dip formed article obtained by dip forming the latex composition of the present invention. Dip forming means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip formed article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold by heating is usually dried. The drying conditions may be appropriately selected.

Next, the deposit formed on the mold is cross-linked by heating.

While the heating conditions in cross-linking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

The mold is preferably washed with water or warm water in order to remove water-soluble impurities (for example, excessive surfactant and/or coagulating agent) before or after heating the mold on which the latex composition is deposited. The warm water used is preferably at 40° C. to 80° C., more preferably at 50° C. to 70° C.

The dip formed article after cross-linking is detached from the mold. Specific examples of the detaching method include a method for releasing the article from the mold by hand and a method for releasing the article by water pressure or compressed air pressure. In the case where the dip formed article during cross-linking has a sufficient strength for detaching, the dip formed article may be detached during cross-linking and continuously subsequently cross-linked.

The film formed article of the present invention, and a dip formed article according to one aspect of the present invention are each obtained using the above-mentioned latex composition of the present invention, thus are each favorably formed into a film, are also excellent in tensile strength and elongation and have a flexible texture, and can be particularly suitably used as, for example, a glove. In the case where the film formed article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the film formed article to thereby enhance slipping during detachment.

The film formed article of the present invention, and a dip formed article according to one aspect of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

Packaging Structure

The packaging structure of the present invention exhibits a structure that is obtained by performing adhesion and stacking of a first sheet substrate and a second sheet substrate each coated with the above-mentioned the synthetic polyisoprene latex of the present invention, and that can receive an object to be packaged. Specifically, the packaging structure of the present invention is a structure obtained by pushing the first sheet substrate and the second sheet substrate with a surface of the first sheet substrate and a surface of the second sheet substrate, coated with the synthetic polyisoprene latex (surfaces coated with the latex), being in contact with each other so that the surfaces coated with the latex are opposite to each other with an object to be packaged being, if necessary, interposed therebetween, to thereby allow the first sheet substrate and the second sheet substrate to adhere to each other, thereby enabling the object to be packaged, to be packaged. Examples of the object to be packaged include, but are not particularly limited, various objects to be packaged, which are desired to be sterilized, as medical products such as a plaster. Examples of the first sheet substrate and the second sheet substrate include, but are not particularly limited, a paper material such as glassine paper, a high-density polyethylene unwoven cloth, a polyolefin film, and a polyester film, and among them, a paper material is preferable and glassine paper is particularly preferable because such paper materials are excellent in handleability (have proper bendability) and are inexpensive.

EXAMPLES

Hereinafter, the present invention will be specifically described with reference to Examples, but the present invention is not intended to be limited to such Examples. Hereinafter, "part(s)" is on a weight basis, unless particularly noted. Various physical properties were measured as follows.

Molecular Weight Distribution Curve, Weight Average Molecular Weight (Mw)

A sample was diluted with tetrahydrofuran so that the solid content concentration was 0.1% by weight, and the resulting solution was subjected to gel permeation chromatography analysis in terms of standard polystyrene, thereby obtaining a molecular weight distribution curve, to calculate the weight average molecular weight (Mw).

Solid Content Concentration 2 g of a sample was accurately weighed (weight: X2) in an aluminum dish (weight: X1), and dried in a hot air drier at 105° C. for 2 hours. Next, the dried product was cooled in a desiccator and weighed together with the aluminum dish (weight: X3), and the solid content concentration was calculated according to the following calculation expression.

$$\text{Solid content concentration (\% by weight)} = (X3-X1) \times 100/X2$$

Film Formability

After a glass mold covered with a coagulating agent was dipped in a composition for dip forming, the resultant was dipped in warm water and air dried to provide a film, a part of the film was subjected to observation of the interface of a synthetic polyisoprene particle by using a scanning electron microscope (SEM), and the film formability was evaluated according to the following criteria.

A: no interface of the synthetic polyisoprene particle was observed.

B: the interface of the synthetic polyisoprene particle was observed, but little observed.

C: the interface of the synthetic polyisoprene particle was observed, but slightly observed.

D: the interface of the synthetic polyisoprene particle was considerably observed.

Tensile Strength, Elongation at Breakage, and Tensile Stress at 500% of Dip Formed Article A film-shaped dip formed article having a thickness of about 0.2 mm was subjected to punching by a dumbbell (trade name "Super Dumbbell (Model: SDMK-100C)", manufactured by Dumbbell Co., Ltd.) to produce a test piece for tensile strength measurement, based on ASTM D412. The test piece was pulled at a tensile rate of 500 mm/min by a Tensilon universal tester (trade name "RTG-1210" manufactured by ORIENTEC Co., Ltd.) to measure the tensile strength (unit: MPa) immediately before breakage, the elongation (unit: %) immediately before breakage, and the tensile stress (unit: MPa) at a rate of elongation of 500%. A higher tensile strength and a higher elongation at breakage are more preferable. A lower tensile stress at 500% is more preferable because a dip formed article is more excellent in flexibility.

Production Example 1 (Production of a Solution of Synthetic Polyisoprene (A-1) in n-Hexane)

An autoclave dried and purged with nitrogen, and equipped with stirrer was charged with 1150 parts of n-hexane having a water content of 23 ppm by weight, dried by a molecular sieve, as an organic solvent (namely, n-hexane including 23 ppm by weight of water as a deactivator), and 100 parts of isoprene. Next, the temperature in the autoclave was set to 60° C., and 0.03 parts of a solution in hexane, having a concentration of n-butyllithium of 15% by weight, was added with stirring to allow a reaction to run for 1 hour. The polymerization reaction rate was 99%. To the resulting polymer solution was added 0.05 parts of methanol as a polymerization terminator, to terminate the reaction, thereby obtaining a solution of synthetic polyisoprene (A-1) in n-hexane. The solution of synthetic polyisoprene (A-1) in n-hexane was subjected to molecular weight distribution curve measurement according to the above method, and as a result, the molecular weight distribution curve was bimodal (two local maximum points of a local maximum point with respect to a low-molecular weight synthetic isoprene chain and a local maximum point with respect to a high-molecular weight synthetic isoprene chain were confirmed). The weight average molecular weight with respect to the low-molecular weight synthetic isoprene chain (in the case where a local minimum point located between the local maximum point with respect to the low-molecular weight synthetic isoprene chain and the local maximum point with respect to the high-molecular weight synthetic isoprene chain was defined as the boundary, the above weight average molecular weight corresponded to a weight average molecular weight on a side of a lower molecular weight relative to the local minimum point) was 420,000, and the weight average molecular weight with respect to the high-molecular weight synthetic isoprene chain (weight average molecular weight on a side of a higher molecular weight at the local minimum point or more) was 3,720,000. The weight ratio "low-molecular weight synthetic isoprene chain having a molecular weight of less than 1,000,000: high-molecular weight synthetic isoprene chain having a molecular weight of 1,000,000 or more" was 49:51.

Production Example 2 (Production of Solution of Synthetic Polyisoprene (A-2) in n-Hexane)

A solution of synthetic polyisoprene (A-2) in n-hexane was obtained in the same manner as in Production Example 1 except that 1150 parts of n-hexane was used in an amount of water of 10 ppm by weight, instead of n-hexane having a water content of 23 ppm by weight. The resulting solution of synthetic polyisoprene (A-2) in n-hexane had a bimodal molecular weight distribution curve, the weight average molecular weight with respect to the low-molecular weight synthetic isoprene chain was 460,000, the weight average molecular weight with respect to the high-molecular weight synthetic isoprene chain was 3,210,000, and the weight ratio "low-molecular weight synthetic isoprene chain having a molecular weight of less than 1,000,000: high-molecular weight synthetic isoprene chain having a molecular weight of 1,000,000 or more" was 38:62.

Production Example 3 (Production of Solution of Low-Molecular Weight Synthetic Isoprene Chain (B-1) in n-Hexane)

A reaction was allowed to run in the same manner as in Production Example 1 except that 1150 parts of n-hexane having a water content of 2 ppm by weight was used instead of n-hexane having a water content of 23 ppm by weight and the amount of the solution having a concentration of n-butyllithium of 15% by weight, in hexane, to be used was changed to 0.11 parts, and thus a solution of monomodal low-molecular weight synthetic isoprene chain (B-1) in n-hexane was obtained where only the local maximum point with respect to the low-molecular weight synthetic isoprene chain appeared in the molecular weight distribution curve. The weight average molecular weight with respect to the low-molecular weight synthetic isoprene chain of low-molecular weight synthetic isoprene chain (B-1) in the resulting solution in n-hexane was 430,000.

Production Example 4 (Production of Solution of High-Molecular Weight Synthetic Isoprene Chain (C-1) in n-Hexane)

A reaction was allowed to run in the same manner as in Production Example 1 except that n-hexane having a water content of 2 ppm by weight was used instead of n-hexane having a water content of 23 ppm by weight, and thus a solution of monomodal high-molecular weight synthetic isoprene chain (C-1) in n-hexane was obtained where only the local maximum point with respect to the high-molecular weight synthetic isoprene chain appeared in the molecular weight distribution curve. The weight average molecular weight with respect to the high-molecular weight synthetic isoprene chain of high-molecular weight synthetic isoprene chain (C-1) in the resulting solution in n-hexane was 3,460,000.

Production Example 5 (Production of Solution of Low-Molecular Weight Synthetic Isoprene Chain (B-2) in n-Hexane)

A reaction was allowed to run in the same manner as in Production Example 1 except that n-hexane having a water content of 2 ppm by weight was used instead of n-hexane having a water content of 23 ppm by weight and the amount of the solution having a concentration of n-butyllithium of 15% by weight, in hexane to be used, was changed to 0.06 parts, and thus a solution of monomodal low-molecular weight synthetic isoprene chain (B-2) in n-hexane was obtained where only the local maximum point with respect to the low-molecular weight synthetic isoprene chain appeared in the molecular weight distribution curve. The weight average molecular weight with respect to the low-molecular weight synthetic isoprene chain of low-molecular weight synthetic isoprene chain (B-2) in the resulting solution in n-hexane was 850,000.

Example 1

Preparation of Synthetic Polyisoprene Latex

To 60° C. was heated 1250 parts of the solution of synthetic polyisoprene (A-1) in n-hexane obtained in Production Example 1, and mixed by a line mixer with 1250 parts of an aqueous sodium rosinate solution having a concentration of 1.0% by weight, heated to 60° C., with the flow rate being adjusted to 1:1 on a weight ratio, and subsequently mixed by use of a homogenizer to thereby obtain an emulsified liquid.

Next, the emulsified liquid was warmed to 80° C. under reduced pressure to distill off n-hexane, thereby obtaining a water dispersion liquid of synthetic polyisoprene (A-1). The resulting water dispersion liquid was subjected to centrifugation with a continuous centrifuge machine, thereby obtaining a synthetic polyisoprene latex having a solid content concentration of 65% by weight, as a light liquid.

Preparation of Composition for Dip Forming

Added was sodium dodecylbenzenesulfonate having a concentration of 10% with stirring of the synthetic polyisoprene latex so that the amount thereof in terms of the solid content was 1 part based on 100 parts of synthetic polyisoprene (A-1), thereby obtaining a mixture. While the resulting mixture was stirred, 1.5 parts of zinc oxide, 1.5 parts of sulfur, 2 parts of an antioxidant (trade name: "Wingstay L" manufactured by Goodyear Tire and Rubber Company), 0.3 parts of zinc diethyldithiocarbamate, 0.5 parts of zinc dibutyldithiocarbamate and 0.7 parts of a zinc salt of mercaptobenzothiazole, in terms of the solid content based on 100 parts of synthetic polyisoprene (A-1) in the mixture, were added as water dispersion liquids of such respective compounding agents, and thereafter an aqueous potassium hydroxide solution was added to obtain a composition for dip forming, in which the pH was adjusted to 10.5. Thereafter, the resulting composition for dip forming was aged in a constant temperature water bath adjusted at 30° C. for 24 hours.

Production of Dip Formed Article

A glass mold with a frosted surface (having a diameter of about 5 cm and a length of a frosted portion of about 15 cm) was washed, pre-heated in an oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and taken out.

Next, the glass mold covered with the coagulating agent was dried in an oven at 70° C. Thereafter, the glass mold covered with the coagulating agent was taken out from the oven, dipped in the composition for dip forming, adjusted to 25° C., for 10 seconds and then taken out, and dried at room temperature for 60 minutes, thereby obtaining a glass mold covered with a film. The glass mold covered with a film was then dipped in warm water at 60° C. for 2 minutes, and thereafter air dried at room temperature for 30 minutes. The film air dried was partially subjected to evaluation of film formability according to the above method. The results are shown in Table 1.

Thereafter, the glass mold covered with a film was subjected to vulcanization by heating in an oven at 120° C. for 20 minutes. The glass mold covered with a film, subjected to vulcanization, was cooled to room temperature, talc was spread thereon, and thereafter the film subjected to vulcanization was peeled from the glass mold, thereby obtaining a dip formed article (rubber glove). The resulting dip formed article (rubber glove) was subjected to each measurement of the tensile strength, the elongation at breakage, and the stress at 500% elongation according to the above methods. The results are shown in Table 1.

Example 2

A film air dried and a dip formed article (rubber glove) were produced and evaluated in the same manner as in Example 1 except that synthetic polyisoprene (A-2) obtained in Production Example 2 was used instead of synthetic polyisoprene (A-1) obtained in Production Example 1. The results are shown in Table 1.

Example 3

A film air dried and a dip formed article (rubber glove) were produced and evaluated in the same manner as in Example 1 except that low-molecular weight synthetic isoprene chain (B-1) obtained in Production Example 3 and high-molecular weight synthetic isoprene chain (C-1) obtained in Production Example 4 were mixed and used so that the weight ratio "low-molecular weight synthetic isoprene chain (B-1): high-molecular weight synthetic isoprene chain (C-1)" was 15:85, instead of synthetic polyisoprene (A-1) obtained in Production Example 1. The results are shown in Table 1.

Example 4

A film air dried and a dip formed article (rubber glove) were produced and evaluated in the same manner as in Example 1 except that low-molecular weight synthetic isoprene chain (B-2) obtained in Production Example 5 and high-molecular weight synthetic isoprene chain (C-1) obtained in Production Example 4 were mixed and used so that the weight ratio "low-molecular weight synthetic isoprene chain (B-2): high-molecular weight synthetic isoprene chain (C-1)" was 15:85, instead of synthetic polyisoprene (A-1) obtained in Production Example 1. The results are shown in Table 1.

Comparative Example 1

A film air dried and a dip formed article (rubber glove) were produced and evaluated in the same manner as in Example 1 except that high-molecular weight synthetic isoprene chain (C-1) obtained in Production Example 4 was used instead of synthetic polyisoprene (A-1) obtained in Production Example 1. The results are shown in Table 1.

Comparative Example 2

A film air dried and a dip formed article (rubber glove) were produced and evaluated in the same manner as in Example 1 except that low-molecular weight synthetic isoprene chain (B-1) obtained in Production Example 3 was used instead of synthetic polyisoprene (A-1) obtained in Production Example 1. The results are shown in Table 1.

Comparative Example 3

A film air dried and a dip formed article (rubber glove) were produced and evaluated in the same manner as in Example 1 except that low-molecular weight synthetic isoprene chain (B-1) obtained in Production Example 3 and high-molecular weight synthetic isoprene chain (C-1) obtained in Production Example 4 were mixed and used so that the weight ratio "low-molecular weight synthetic isoprene chain (B-1): high-molecular weight synthetic isoprene chain (C-1)" was 80:20, instead of synthetic polyisoprene (A-1) obtained in Production Example 1. The results are shown in Table 1.

TABLE 1

| | Method for producing synthetic polyisoprene | | Content rate of synthetic polyisoprene chain | | Weight average molecular weight | | Dip formed article | | | |
|---|---|---|---|---|---|---|---|---|---|---|
| | Preparation method*) | Concentration of deactivator (ppm by weight) | Amount of solution of n-butyllithium to be used (parts) | Low-molecular weight synthetic isoprene chain (% by weight) | High-molecular weight synthetic isoprene chain (% by weight) | Weight average molecular weight on lower molecular weight side | Weight average molecular weight on higher molecular weight side | Film formability | Tensile strength (MPa) | Tensile elongation (%) | Tensile stress at 500% (MPa) |
| Example 1 | Deactivator | 23 | 0.03 | 49 | 51 | 120,000 | 3,720,000 | A | 28 | 1150 | 1.8 |
| Example 2 | Deactivator | 10 | 0.03 | 38 | 62 | 460,000 | 3,210,000 | B | 24 | 980 | 1.7 |
| Example 3 | Mixing | — | — | 15 | 85 | 430,000 | 3,460,000 | B | 22 | 940 | 1.8 |
| Example 4 | Mixing | — | — | 15 | 85 | 850,000 | 3,460,000 | C | 20 | 910 | 1.9 |
| Comparative Example 1 | Deactivator | 2 | 0.03 | — | 100 | — | 3,460,000 | D | 17 | 1100 | 1.9 |
| Comparative Example 2 | Deactivator | 2 | 0.11 | 100 | — | 430,000 | — | A | 14 | 880 | 1.6 |
| Comparative Example 3 | Mixing | — | — | 80 | 20 | 430,000 | 3,460,000 | A | 18 | 920 | 1.7 |

*) In Table 1, "Deactivator" means direct production of synthetic isoprene with coexistence of a low-molecular weight synthetic isoprene chain and a high-molecular weight synthetic isoprene chain, by adjustment of the content rate of water (deactivator) in n-hexane used as an organic solvent. "Mixing" means production of synthetic isoprene by mixing a low-molecular weight synthetic isoprene chain synthesized in advance and a high-molecular weight synthetic isoprene chain synthesized in advance.

As clear from Table 1, in the case where a latex of synthetic polyisoprene including a low-molecular weight synthetic isoprene chain at a content rate of 10 to 70% by weight and a high-molecular weight synthetic isoprene chain at a content rate of 30 to 90% by weight was used, not only film formability in dip forming was excellent, but also the resulting dip formed article was excellent in tensile strength and elongation, and had a flexible texture (Examples 1 to 4).

On the other hand, in the case where a latex made of a high-molecular weight synthetic isoprene chain was used, film formability in dip forming was inferior, resulting in a reduction in tensile strength of the resulting dip formed article (Comparative Example 1).

Moreover, in the case where a latex made of a low-molecular weight synthetic isoprene chain was used, film formability in dip forming was excellent, but tensile strength of the resulting dip formed article was reduced (Comparative Example 2).

Furthermore, even in the case where synthetic polyisoprene containing a low-molecular weight synthetic isoprene chain and a high-molecular weight synthetic isoprene chain was used, a too high content rate of the low-molecular weight synthetic isoprene chain (a too low content rate of the high-molecular weight synthetic isoprene chain) resulted in a reduction in tensile strength of the resulting dip formed article, although film formability in dip forming was excellent (Comparative Example 3).

The invention claimed is:

1. A synthetic polyisoprene latex comprising synthetic polyisoprene, wherein
the synthetic polyisoprene constituting the synthetic polyisoprene latex comprises a low-molecular weight synthetic isoprene chain having a molecular weight of less than 1,000,000 at a content rate of 10 to 70% by weight and a high-molecular weight synthetic isoprene chain having a molecular weight of 1,000,000 or more at a content rate of 30 to 90% by weight,
the synthetic polyisoprene constituting the synthetic polyisoprene latex has a molecular weight distribution curve that is bimodal with two local maximum points, with a local minimum point located between the two local maximum points, the local minimum point defining a boundary between a low-molecular weight side and a high-molecular weight side of the molecular weight distribution curve,
a weight average molecular weight on the low-molecular weight side is from 200,000 to less than 1,000,000, and
a weight average molecular weight on the high-molecular weight side is from 3,000,000 to 6,000,000.

2. A method for producing the synthetic polyisoprene latex according to claim 1, wherein
the synthetic polyisoprene comprising the low-molecular weight synthetic isoprene chain and the high-molecular weight synthetic isoprene chain is obtained by polymerizing a monomer containing isoprene in an organic solvent by use of an organic alkali metal catalyst.

3. The method for producing the synthetic polyisoprene latex according to claim 2, wherein an organic solvent comprising a deactivator is used as the organic solvent.

4. A method for producing the synthetic polyisoprene latex according to claim 1, comprising
a step of polymerizing a monomer containing isoprene in an organic solvent by use of an organic alkali metal catalyst, thereby obtaining a first polymer solution mainly comprising the low-molecular weight synthetic isoprene chain,
a step of polymerizing a monomer containing isoprene in an organic solvent by use of an organic alkali metal catalyst, thereby obtaining a second polymer solution mainly comprising the high-molecular weight synthetic isoprene chain, and
a step of mixing the first polymer solution and the second polymer solution, thereby obtaining the synthetic polyisoprene.

5. The method for producing the synthetic polyisoprene latex according to claim 4, wherein an amount of the organic alkali metal catalyst to be used in obtaining the first polymer solution is larger than an amount of the organic alkali metal catalyst to be used in obtaining the second polymer solution.

6. A method for producing the synthetic polyisoprene latex according to claim 1, comprising
a step of emulsifying a polymer solution of the synthetic polyisoprene obtained by polymerizing a monomer containing isoprene, by use of an aqueous surfactant solution.

7. A latex composition comprising the synthetic polyisoprene latex according to claim 1 and a cross-linking agent.

8. A film formed article comprising the latex composition according to claim 7.

9. A packaging structure obtained by performing adhesion and stacking of at least a part of a first sheet substrate and at least a part of a second sheet substrate thorough a coating film comprising the synthetic polyisoprene latex according to claim 1, wherein an object to be packaged is receivable between the first sheet substrate and the second sheet substrate.

10. The synthetic polyisoprene latex according to claim 1, wherein
the weight average molecular weight on the high-molecular weight side is from 3,210,000 to 6,000,000.

11. The synthetic polyisoprene latex according to claim 1, wherein
an isoprene unit content of the low-molecular weight synthetic isoprene chain having a molecular weight of less than 1,000,000 is 90% by weight or more.

12. The synthetic polyisoprene latex according to claim 1, wherein
an isoprene unit content of the high-molecular weight synthetic isoprene chain having a molecular weight of 1,000,000 or more is 90% by weight or more.

13. The method for producing the synthetic polyisoprene latex according to claim 6, wherein
the polymer solution of the synthetic polyisoprene is directly emulsified by use of an aqueous surfactant solution without coagulation.

14. The method for producing the synthetic polyisoprene latex according to claim 13, wherein
the aqueous surfactant solution comprises a anionic surfactant.

15. The method for producing the synthetic polyisoprene latex according to claim 13, wherein
the aqueous surfactant solution comprises sodium rosinate.

16. The method for producing the synthetic polyisoprene latex according to claim 14, wherein
the amount of the anionic surfactant is 0.1 to 50 parts by weight based on 100 parts by weight of the synthetic polyisoprene.

17. The method for producing the synthetic polyisoprene latex according to claim 13, wherein
the amount of water in the aqueous surfactant solution is 30 to 150 parts by weight based on 100 parts by weight of the polymer solution of the synthetic polyisoprene.

\* \* \* \* \*